United States Patent
Algüera

(10) Patent No.: US 11,260,711 B2
(45) Date of Patent: Mar. 1, 2022

(54) CONNECTION DEVICE, CONNECTION SYSTEM AND TRACTOR-TRAILER COMBINATION

(71) Applicant: Jost-Werke Deutschland GmbH, Neu-Isenburg (DE)

(72) Inventor: José Manuel Algüera, Aschaffenburg (DE)

(73) Assignee: JOST-WERKE DEUTSCHLAND GMBH, Neu-Isenburg (DE)

(*) Notice: Subject to any disclaimer, the term of this patent is extended or adjusted under 35 U.S.C. 154(b) by 0 days.

(21) Appl. No.: 16/789,900

(22) Filed: Feb. 13, 2020

(65) Prior Publication Data
US 2020/0269642 A1   Aug. 27, 2020

(30) Foreign Application Priority Data
Feb. 21, 2019 (DE) .................. 10 2019 202 352.5

(51) Int. Cl.
| | | |
|---|---|---|
| *B60D 1/64* | (2006.01) | |
| *B60T 17/04* | (2006.01) | |
| *B62D 53/12* | (2006.01) | |
| *H01R 13/00* | (2006.01) | |

(52) U.S. Cl.
CPC .............. *B60D 1/64* (2013.01); *B60T 17/043* (2013.01); *B62D 53/125* (2013.01); *H01R 13/005* (2013.01); *H01R 2201/26* (2013.01)

(58) Field of Classification Search
CPC .......... B62D 53/125; B60D 1/64; B60D 1/62; B60D 1/015; B60D 1/26; B60D 1/36; B60D 1/42; B60Q 1/0088; B60Q 1/0483; B60Q 1/24; B60R 16/02; B60R 16/08; B60T 17/043; H01R 13/005; H01R 13/60; H01R 13/639; H01R 2201/26
See application file for complete search history.

(56) References Cited

U.S. PATENT DOCUMENTS

| | | | |
|---|---|---|---|
| 5,458,357 A | 10/1995 | Wohlhüter | |
| 5,607,221 A * | 3/1997 | Justus | ...... B60Q 1/24 280/420 |
| 5,660,408 A * | 8/1997 | Johnson | ...... B60D 1/62 248/75 |
| 7,464,967 B2 * | 12/2008 | Mieger | ...... E02F 9/2271 285/124.5 |
| 8,177,559 B2 * | 5/2012 | Alguera | ...... H01R 13/639 439/35 |

(Continued)

FOREIGN PATENT DOCUMENTS

| | | |
|---|---|---|
| DE | 4135795 A1 | 5/1993 |
| DE | 102004062172 A1 | 7/2006 |
| DE | 102006012800 A1 | 9/2007 |

*Primary Examiner* — Edwin A. Leon
*Assistant Examiner* — Matthew T Dzierzynski
(74) *Attorney, Agent, or Firm* — Hudak, Shunk & Farine Co. LPA

(57) ABSTRACT

A connection device for connecting of electrical and pneumatic lines between a tractor and a trailer having a first end, a second end, and at least two lines connecting the two ends, wherein at least a first pneumatic plug element and at least a first electrical plug element is arranged at the first end and wherein a first plug-in unit is arranged at the second end, having at least a first pneumatic connecting element and at least a first electrical connecting element.

19 Claims, 10 Drawing Sheets

(56) References Cited

U.S. PATENT DOCUMENTS

| | | | | |
|---|---|---|---|---|
| 8,187,020 B2* | 5/2012 | Alguera | ............... | B62D 53/125 |
| | | | | 439/378 |
| 10,864,823 B2* | 12/2020 | Raikh | ................ | H01R 13/6205 |
| 10,938,149 B2* | 3/2021 | Li | ...................... | H01R 13/6205 |
| 2011/0133430 A1 | 6/2011 | Morris | | |
| 2019/0106006 A1* | 4/2019 | Ng | ....................... | H01R 12/716 |

* cited by examiner

CONNECTION DEVICE, CONNECTION SYSTEM AND TRACTOR-TRAILER COMBINATION

FIELD OF THE INVENTION

The present invention relates to a connection device for connecting of electrical and pneumatic lines between a tractor and a trailer, a connection system for a tractor-trailer combination having a connection device, and a tractor-trailer combination having a connection device or a connection system.

BACKGROUND OF THE INVENTION

Articulated vehicles are a subgrouping of trucks, comprising a tractor and a trailer. In traditional articulated vehicles, the tractor is motorized and the trailer is not motorized. Thus, a tractor is necessary for the moving of the trailer.

Articulated vehicles are used primarily for the transporting of goods. Tractor and trailer are coupled together in releasable manner. It is therefore possible to park a trailer, i.e., to decouple the tractor from the trailer. In this way, it is possible to load or unload the trailer while the tractor along with the driver can be employed elsewhere.

The coupling of the tractor and trailer involves a mechanical coupling, which is usually done by means of a fifth wheel and a king pin. In addition, tractor and trailer are joined together by means of pneumatic and electrical lines. Through the pneumatic lines, the tractor provides the trailer with compressed air for the brake system of the trailer. The electrical lines serve chiefly for the lighting (blinkers, tail light, etc.) of the trailer, but also a cooling of the trailer is done by means of electricity, provided by the tractor through the electrical lines.

The making of the electrical and pneumatic connections between the tractor and the trailer is done manually. Often, it is the driver who attaches them. This process is time consuming and prone to error.

U.S. Pat. No. 5,458,357 discloses a tractor-trailer combination in which multiple lines are provided for the connecting of tractor and trailer. A multiple coupling is provided for the connection, by which multiple lines can be connected at the same time.

From US 2011/0133430 A1 there is known an air brake connection system in which a hose is provided for the connecting of a coupling piece of the tractor to a coupling piece of the trailer. The hose has a self-sealing valve at both ends.

DE 41 35 795 A1 discloses a tractor-trailer combination in which a service coupling is provided between the two vehicles, which automatically closes when the two vehicles are coupled together and automatically opens when the two vehicles are separated.

From DE 10 2004 062 172 A1 there is specified a system for connecting of service lines between a tractor and a trailer which can be coupled to it. A fifth wheel and an automated line coupling system with at least one plug and socket are arranged on the tractor.

DE 10 2006 012 800 A1 discloses a coupling assistant for connecting at least one service line between a first vehicle and a second vehicle which can be coupled to it via a coupling. The coupling assistant comprises a service head arranged on the second vehicle for plugging in the at least one service line.

SUMMARY OF THE INVENTION

The autonomy of vehicles may mean that, in certain areas where vehicles are being coupled or uncoupled autonomously or automatically, the presence of people is undesirable or prohibited. Therefore, the problem which the invention proposes to solve is to simplify the making of the electrical and pneumatic connections between tractor and trailer or to organize it so that it can be automated at least in these areas.

This problem is solved by a connection device according to the invention.

The connection device according to the invention for connecting of electrical and pneumatic lines between a tractor and a trailer comprises a first end, a second end, and at least two lines connecting the two ends. At least one pneumatic plug element and/or at least one electrical plug element is arranged at the first end. A first plug-in unit is arranged at the second end, comprising at least one pneumatic connecting element and/or at least one electrical connecting element.

The pneumatic and electrical plug elements of the connection device are preferably complementary to pneumatic and electrical plug elements of the trailer.

The first plug-in unit is preferably complementary to a second plug-in unit of the tractor.

The plug element may either be a socket or a plug. Plug and socket are complementary components and mutually produce a plug-in connection.

In advantageous modifications, the first plug-in unit comprises a non-rotationally symmetrical housing. In this way, a complementary second plug-in unit, which preferably likewise comprises a non-rotationally symmetrical housing, can only be connected in one way to the first plug-in unit. A defective connection of the plug-in units is prevented in this way.

In alternative embodiments, the first connecting elements are provided preferably at least partly in rotationally symmetrical double occupancy. In a rotationally symmetrical double occupancy, a connecting element is present twice and in identical design. The double connecting elements are arranged with rotational symmetry about a center axis of the first plug-in unit. In order to make a connection, however, only one of the doubly present connecting elements needs to be connected to a mating piece. The significant benefit of this is that the second plug-in unit, having only one mating piece for the doubly present connecting element, can be connected to the first plug-in unit in two positions, rotated by 180° with respect to each other. In both positions, the mating piece is coupled to one of the two doubly present connecting elements.

In other embodiments, the first pneumatic and the first electrical connecting element are arranged concentrically, while multiple pneumatic and/or multiple electrical connecting elements can also be arranged concentrically. Whereas in the rotationally symmetrical double occupancy only two positions are possible in which the first plug-in unit can be arranged in order to be connected to the second plug-in unit, a rotation about the center axis has no effect in the concentric arrangement. The first and the second plug-in unit can be coupled together regardless of the angle of rotation of the first plug-in unit and the second plug-in unit to each other.

The first plug-in unit comprises at least one centrally arranged first pneumatic connecting element. The centrally arranged pneumatic connecting element is preferably rotationally symmetrical about the center axis and the center axis lies at the center of the centrally arranged pneumatic connecting element.

In the rotationally symmetrical double occupancy, the centrally arranged first pneumatic connecting element is not present in double occupancy, since it is independent of the rotation about the center axis. However, it is possible to provide in addition further first pneumatic connecting elements in rotationally symmetrical double occupancy, so that on the whole three or five first pneumatic connecting elements are present, for example.

In the concentric arrangement, it is likewise advantageous to provide a centrally arranged first pneumatic connecting element. Pneumatic connecting elements need to be sealed off. Thanks to the central arrangement, a seal can be saved, since only a radially outward seal, but not a radially inward seal is needed.

In advantageous modifications, the connection device comprises at least one fastening device, by means of which the first plug-in unit can be fastened to a predetermined point on the trailer. In this way, it becomes possible to automate the connecting process between first and second plug-in unit. In an automatic connecting process, the position of the first plug-in unit is fixed at the predetermined location and does not need to be determined in advance.

The fastening device can be one-piece or multiple pieces. For example, the fastening device may comprise a first part, which is permanently arranged on the trailer, and a second part, which is releasably connected to the first part. If the fastening device is one-piece, it is preferably fastened to the first plug-in unit.

The fastening device is preferably arranged at least partly on the first plug-in unit. In this way, a direct and secure placement of the first plug-in unit on the trailer is made possible.

It is desirable for the fastening of the first plug-in unit on the trailer to take place as fast as possible and in easy manner for the user. In advantageous modifications, the fastening device is therefore at least partly magnetic or comprises at least one magnetic element.

The fastening device preferably comprises two or three platelike side pieces arranged at right angles to each other. In this way, this piece of the fastening device can be arranged on one edge or one corner of the trailer. The corner of the trailer thus represents one possibility for the predetermined location where the plug-in unit can be positioned.

The first plug-in unit preferably comprises a first locating device. In an automated connection process, the position of the first plug-in unit can be determined in this manner. The first locating device preferably comprises a radio element with RFID (radio-frequency identification), NFC (near-field communication) and/or BLE (Bluetooth low energy) technique. Advantageously, the first locating device is passive, i.e., a RFID transponder, for example. In this way, the connection device need not have any energy storage.

The lines of the connection device are preferably flexible, in particular spiral at least in part. In this way, the length of the lines is not dictated, which is of advantage for example when arranging the first plug-in unit at the predetermined location.

The first connecting elements of the first plug-in unit are preferably plugs and/or sockets.

The first plug-in unit in advantageous modifications has a common housing for the first pneumatic and electrical connecting elements. The making of the first plug-in unit is more favorable thanks to the common housing.

In other advantageous modifications, the first plug-in unit comprises a first housing for the first pneumatic connecting elements and a second housing for the first electrical connecting elements, the housings being preferably joined together. This arrangement allows greater individualization of the first plug-in unit. Thus, for example, identical housings may be used for the pneumatic connecting elements for different configurations and different housings may be used for the electrical connecting elements.

The problem of the invention is also solved by a connection system according to the invention.

The connection system for a tractor-trailer combination comprises a connection device with the above-mentioned features and a coupling system which can be arranged on a tractor of the tractor-trailer combination, having a second plug-in unit. The second plug-in unit is designed to be complementary to the first plug-in unit and comprises at least one second pneumatic connecting element and at least one second electrical connecting element.

In certain advantageous modifications, the second plug-in unit comprises a non-rotationally symmetrical housing. In this way, a defective connection of the plug-in units is prevented, as discussed above with regard to the first plug-in unit.

The second connecting elements are preferably provided in many embodiments at least partly in rotationally symmetrical double occupancy. The benefits accomplished in this way are basically the same as those of the rotationally symmetrical double occupancy of the first plug-in unit. However, it is basically enough for only one of the two plug-in units to have connecting elements in rotationally symmetrical double occupancy. If the connecting elements of both plug-in units are provided in rotationally symmetrical double occupancy, the connection between the plug-in units is redundant.

The second pneumatic and the second electrical connecting element are preferably arranged concentrically in many embodiments. Here as well, the benefits described above for the concentric arrangement are achieved.

The second plug-in unit preferably comprises at least one centrally arranged second pneumatic connecting element. As described above, a central connecting element is independent of the rotation of the plug-in unit about the center axis.

The coupling system preferably comprises a catching device for catching the first plug-in unit. The catching device makes it possible to capture the first plug-in unit during an automated connection process so that it can be connected to the second plug-in unit in easy fashion.

The catching device preferably comprises a catching funnel which is arranged in the second plug-in unit. By a catching funnel is generally meant a device making possible a guiding of the first plug-in unit to the second plug-in unit. Preferably the catching funnel has an opening in a first end region which is larger than the contour of the first plug-in unit. The second plug-in unit is arranged in an oppositely situated second end region.

The catching device can preferably be extended together with the second plug-in unit by means of a pneumatic and/or hydraulic and/or electrical first actuator, especially in height-adjustable manner. As described above, the first plug-in unit is preferably fastened to the trailer. For the connecting of the two plug-in units to each other, the plug-in unit can be moved by means of the actuator in the direction of the first plug-in unit until the plug-in units are connected.

The connection consisting of catching device, second plug-in unit and first plug-in unit can then be retracted once more. The first plug-in unit in this case is loosened from the trailer. Thanks to the retracting, the connection is removed from the trailer, which prevents the connection from being damaged during the ride by movements of the trailer (especially when negotiating a curve). It is advantageously provided that the entire connection is situated beneath a front edge of the trailer after the retraction. Thus, the first plug-in unit is also protected against damage.

The first plug-in unit and/or the second plug-in unit preferably comprises at least one arresting means for the releasable fastening of the plug-in units to each other. The arresting ensures that the connection of the plug-in units is not broken during the ride, for example by vibrations. The fastening by the arresting means preferably occurs magnetically and/or pneumatically and/or by means of friction locking and/or by means of form fitting.

The arresting means are preferably automatically releasable. In this way, no manual manipulation of the arresting means is necessary when parking a trailer. At least one second actuator is advantageously provided for the releasing of the arresting means. The second actuator may for example push the plug-in units apart in the manner of ejector, by which the arresting means are also separated. Such an actuator may also be provided when no arresting means are provided.

The problem of the invention is also solved by a tractor-trailer combination according to the invention.

The tractor-trailer combination comprises a tractor, a trailer and either a connection device with the above-mentioned features or a connection system with the above-mentioned features. The trailer comprises second pneumatic and electrical plug elements which are complementary to the first plug elements of the connection device.

The connection device may connect the tractor to the trailer by the complementary configuration. For this, the plug elements of the connection device are first coupled to the plug elements of the trailer. After this, the connecting elements of the first and second plug-in units are joined together. A pneumatic as well as an electrical connection then exists between the tractor and the trailer.

Before the connecting of the connecting elements, the first plug-in unit may be arranged at a predetermined location of the trailer. The connection process between the first and second plug-in unit then takes place preferably in automated manner, especially by means of the coupling system.

The tractor is preferably autonomous, especially at stage 4 or 5 of the standard SAE J3016 of the Society of Automotive Engineers (SAE).

The tractor preferably comprises a drive, a control unit for control of the drive, a communication unit for exchanging information with a traffic management system and a locating unit for locating the tractor. In this way, the tractor-trailer combination can be used in a traffic network, such as that of a harbor, a logistical center, or factory grounds. The drive system preferably comprises, besides a drive unit such as an electric motor, also a chassis with wheels, as well as steering and braking means.

The first plug-in unit is preferably fastened to a front wall of the trailer. In this way, the first plug-in unit is located near the tractor, so that the lines do not have to be very long. The fastening is done preferably by means of the fastening device.

The first plug-in unit is preferably fastened to the front wall above a bottom edge of the front wall of the trailer. In this way, the connection device can be connected to the trailer before the trailer is coupled to the tractor. For example, the connection device can first be arranged on the trailer and an autonomous tractor picks up the trailer at a later time. In order for the tractor not to damage the connection device during the coupling process to the trailer, an arrangement above the bottom edge is advantageous.

The first plug-in unit is preferably fastened to an edge or one of the front corners of the trailer. Trailers generally have standard dimensions, so that the arrangement at a front corner guarantees that the position of the first plug-in unit is precisely defined. The precise positioning facilitates the automating of the connection process of first and second plug-in unit.

The holding force of the fastening device of the first plug-in unit to the trailer is preferably greater than the inserting forces of the first and second plug-in unit. In this way, the first and the second plug-in unit can be automatically joined together without requiring an additional resistance during the inserting process.

The second plug-in unit preferably comprises a second locating device, which interacts with the first locating device of the first plug-in unit. In this way, the relative position of the second plug-in unit with respect to the first plug-in unit can be determined. The relative position can then be used to automate the connection process.

BRIEF DESCRIPTION OF THE DRAWINGS

The invention shall be presented and explained as an example with the aid of the following figures. There are shown FIG. 1 schematically, a connection device, FIG. 2A a trailer with a connection device of FIG. 1 in a side view, FIG. 2B the trailer with connection device of FIG. 2A in a front view, FIG. 3 a tractor-trailer combination during the process of coupling the tractor and trailer in a side view, FIG. 4 the tractor-trailer combination of FIG. 3*e* with connected plug-in units in a side view, FIG. 5 the tractor-trailer combination of FIG. 3 in a ready to drive state, FIG. 6 a trailer with a connection device arranged at a front corner in a front view, FIG. 7 a first plug-in unit and a complementary second plug-in unit in a perspective view, FIG. 8 a coupling system of a tractor in a partial sectioned view, FIG. 9 a trailer according to a third embodiment in a perspective view, FIG. 9A detail A of FIG. 9, FIG. 10 an embodiment of a first plug-in unit in a perspective sectioned view, FIG. 11 a first plug-in unit and a complementary second plug-in unit according to another embodiment in a side view, and FIG. 12 a first plug-in unit in a top view according to another embodiment.

DETAILED DESCRIPTION OF THE INVENTION

Figure 1:
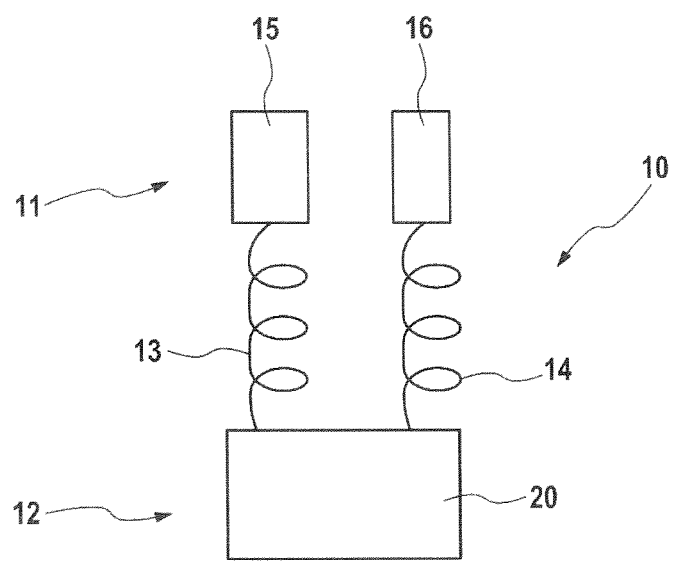

FIG. 1 shows a connection device 10. The connection device 10 comprises at a first end 11 a first pneumatic plug element 15 and a first electrical plug element 16. At a second end 12, situated opposite the first end 11, the connection device 10 comprises a first plug-in unit 20. The first plug-in unit 20 has pneumatic and electrical connecting elements (not shown here).

The first plug-in unit 20 is connected to the first pneumatic plug element 15 across a pneumatic line 13 and to the first electrical plug element 16 across an electrical line 14. The lines 13, 14 are spiral and thus flexible.

Figure 2A:
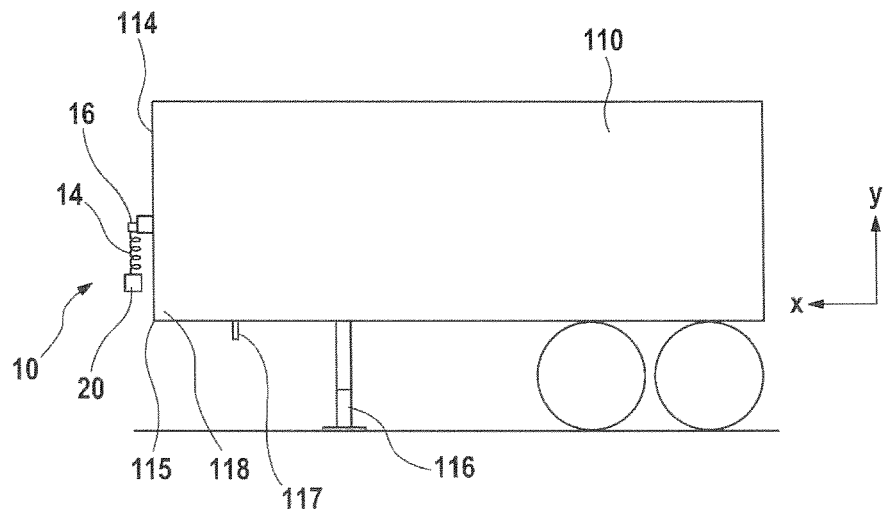

The trailer 110 represented in FIG. 2A is a traditional articulated trailer. The trailer 110 comprises a king pin 117, by means of which it can be coupled to a tractor (not shown here). Moreover, the trailer 110 comprises two support jacks 116 (see FIG. 2B). The support jacks 116 serve for bracing the trailer 110 when the trailer 110 is not coupled to a tractor.

Figure 2B:
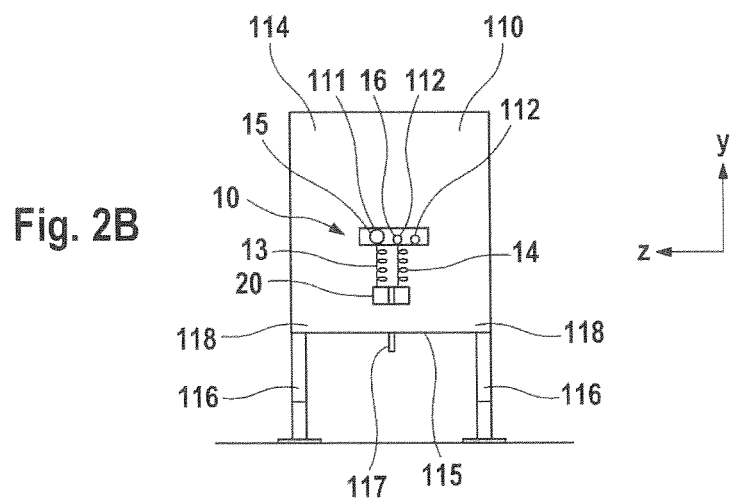

On a front wall 114 of the trailer, which can be seen in FIG. 2B, the trailer 110 comprises a second pneumatic plug element 111 and two second electrical plug elements 112.

The first pneumatic plug element 15 of the connection device 10 is connected to the second pneumatic plug element 111 of the trailer 110. The first electrical plug element 16 is connected to one of the second electrical plug elements 112. The first plug-in unit 20 hangs down from the lines 13, 14. The weight of the first plug-in unit 20 is such that the first plug-in unit 20 is situated above a bottom edge 115 of the trailer 110. In this way, there is no risk of a tractor being coupled to the trailer causing damage to the plug-in unit 20.

Figure 3:
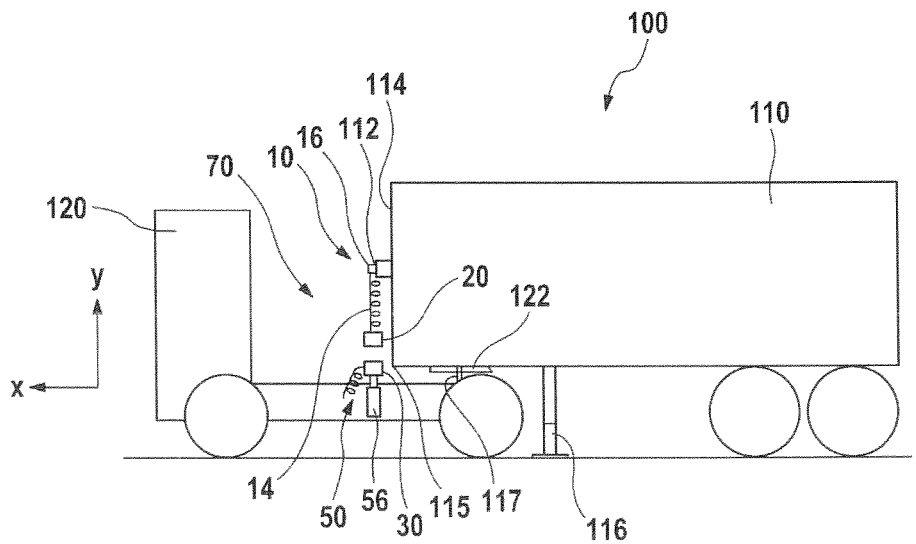

FIG. 3 shows an intermediate stage in the coupling process between tractor 120 and trailer 110 of a tractor-trailer combination 100. The tractor 120 comprises a lifting fifth wheel coupling 122. The king pin 117 of the trailer 110 is already mechanically connected to the lifting fifth wheel coupling 122.

A connection device 10 is provided for the pneumatic and electrical connection of trailer 110 and tractor 120. Moreover, the tractor 120 comprises a coupling system 50.

The coupling system 50 comprises a first actuator 56, on which a second plug-in unit 30 is arranged. The second plug-in unit 30 can be extended by means of the first actuator 56 in the vertical direction (parallel to the y-axis of an orthogonal system of coordinates). The x-axis of the system of coordinates extends in the direction of travel of the tractor-trailer combination when driving straight, the y-axis extends in the direction of gravity, and the z-axis lies in the horizontal.

Figure 4:
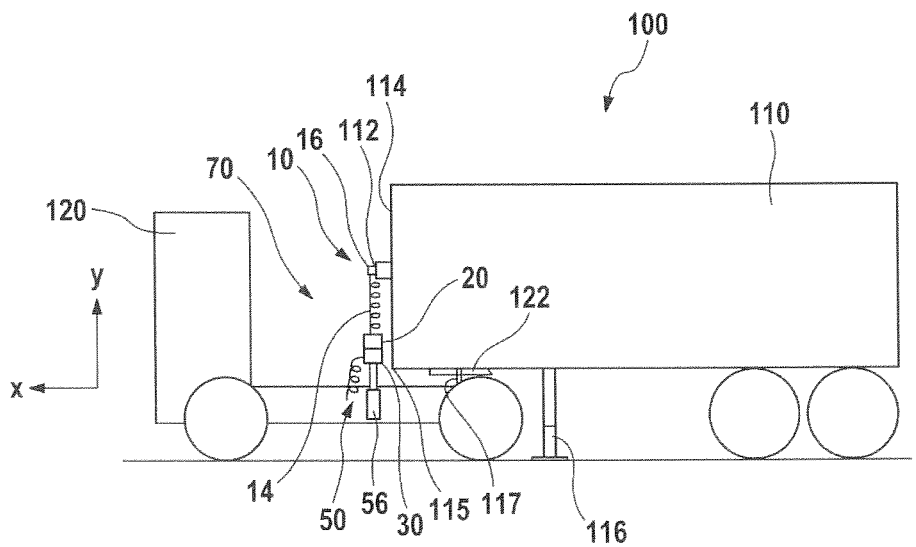

The first plug-in unit 20 of the connection device 10 is arranged above the bottom edge 115 of the trailer 110. In order to join the first plug-in unit 20 and the second plug-in unit 30 to each other, the first actuator 56 is extended in the y-direction, as shown in FIG. 4. In FIG. 4, the first plug-in unit 20 and the second plug-in unit 30 are joined together. In this way, an electrical and a pneumatic connection exist between the trailer 110 and the tractor 120. A control unit (not shown) of the tractor 120 can now release and activate the brakes of the trailer 110, for example, and control the lights of the trailer 110.

The connection device 10 together with the coupling system 50 forms a connection system 70.

Figure 5:
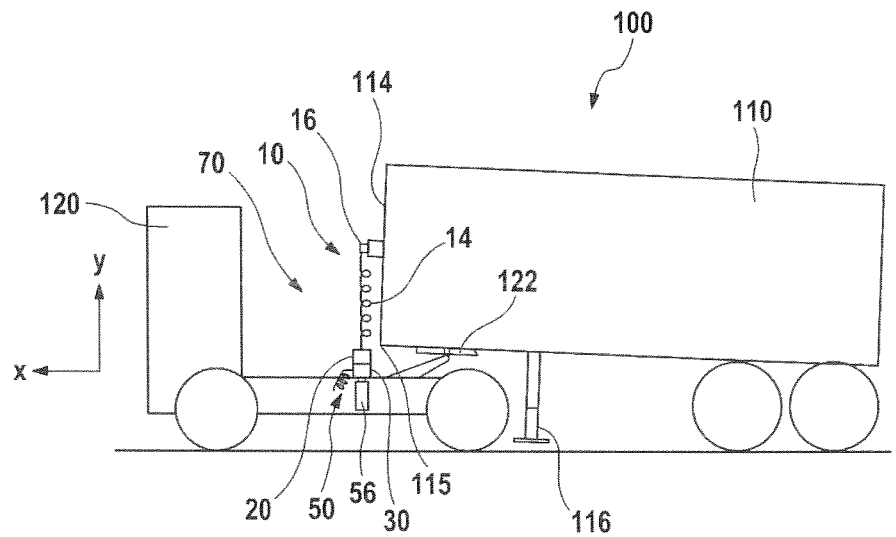

In order to prevent the coupling system 50, the first plug-in unit 20, the second plug-in unit 30 or other components from being damaged during the ride, the actuator 56 is retracted once more after the connecting of the first plug-in unit 20 and the second plug-in unit 30, as shown in FIG. 5. In this process, the first plug-in unit 20 is moved entirely beneath the bottom edge 115 of the trailer 110.

Furthermore, FIG. 5 shows that the trailer 110 has been lifted by means of the lifting fifth wheel coupling 122, so that the support jacks 116 no longer have any contact with the ground. The tractor-trailer combination 100 is now ready to be driven.

For the parking of the trailer 110, at first the lifting fifth wheel coupling 122 is moved downward, so that the support jacks 116 once again lie against the ground. Next, the first plug-in unit 20 and second plug-in unit 30 are separated from each other. No movement of the actuator 56 is required for this. The separating of the separation units 20, 30 may occur manually or automatically. After this, the tractor 120 can move on to other jobs.

Figure 6:
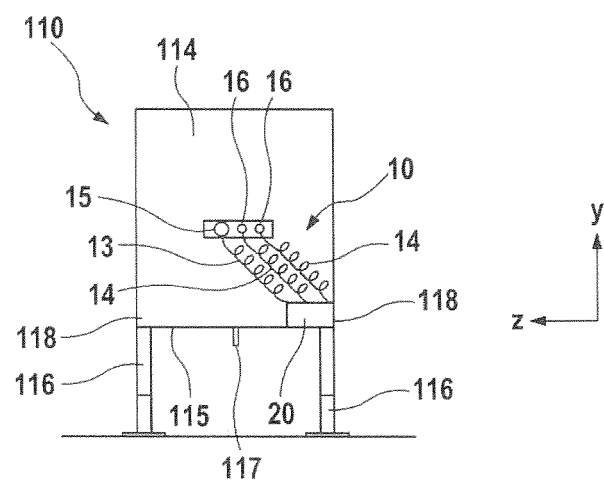

FIG. 6 shows a further embodiment of the connection device 10. The connection device 10 comprises a first pneumatic plug element 15 and two first electrical plug elements 16. The first plug-in unit 20 is connected by means of a pneumatic line 13 and two electrical lines 14 to the plug elements 15, 16.

The first plug-in unit 20 is arranged at a front corner 118 of the trailer 110. Thanks to this arrangement of the first plug-in unit 20, the automation of the connection process between the first and second plug-in unit 20, 30 is simplified. Namely, the plug-in unit 20 is situated at a predetermined location and does not need to be located by the first plug-in unit 30 or the coupling system 50 before the connection can be produced.

Figure 7:
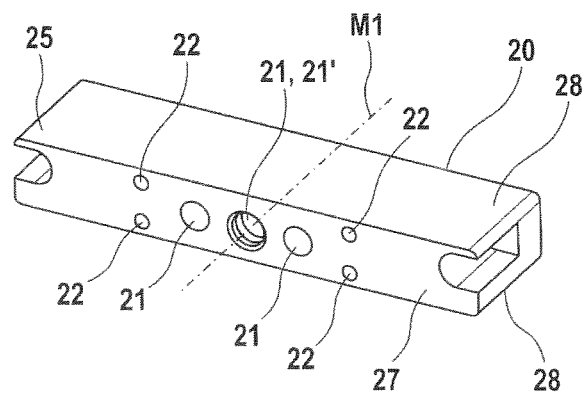
Figure 7:
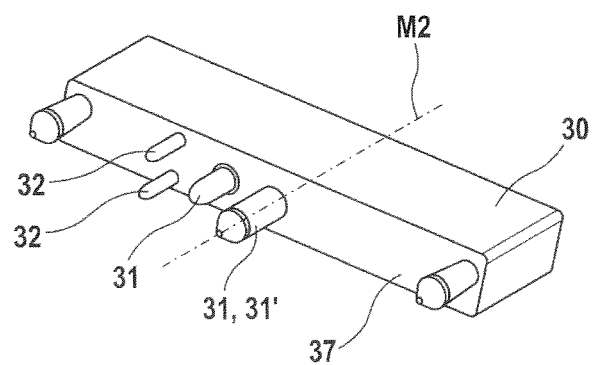

FIG. 7 shows a first plug-in unit 20 and a second plug-in unit 30. The plug-in units 20, 30 are complementary to each other and are joined together, when used as intended, so that their end faces 27, 37 rest against each other.

The first plug-in unit 20 has a total of three first pneumatic connection elements 21, 21' and four first electrical connecting elements 22. The connecting elements 21, 21', 22 are assembled in a common housing 25. The first electrical connecting elements 22 and two of the first pneumatic connecting elements 21 are provided in rotationally symmetrical double occupancy about a first center axis M1. A centrally arranged first pneumatic connecting element 21' is not present twice.

The connecting elements 21, 21', 22 are socket shaped in the embodiment shown. Accordingly, they are present as cylindrical indentations emerging from the first end face 27.

The second plug-in unit 30 has a center axis M2. When the plug-in units 20, 30 are joined together, the center axes M1, M2 are aligned. On the center axis M2 there is provided a centrally arranged second pneumatic connecting element 31'. Furthermore, the second plug-in unit 30 comprises another second pneumatic connecting element 31 as well as two second electrical connecting elements 32.

The connecting elements 31, 32 in the embodiment shown are shaped as plugs. Accordingly, they are present as cylindrical protrusions emerging from the second end face 37.

Thanks to the rotationally symmetrical double occupancy of the first plug-in unit 20, it is possible to join together the first plug-in unit 20 and the second plug-in unit 30 at two different positions, rotated by 180° about the center axes M1, M2.

The first plug-in unit 20 is cuboidal and has two oblong outer sides 28. The first plug-in unit 20 is advantageously arranged on the trailer 110 such that it lies by one of the outer sides 28 against the front wall 114 of the trailer. In this way, a stable position of the first plug-in unit is achieved. Thanks to the rotationally symmetrical double occupancy, it does not matter which of the two outer sides 28 of the first plug-in unit 20 lies against the trailer 110. In either case, a connection between the first plug-in unit 20 and the second plug-in unit 30 is easily possible.

Figure 8:
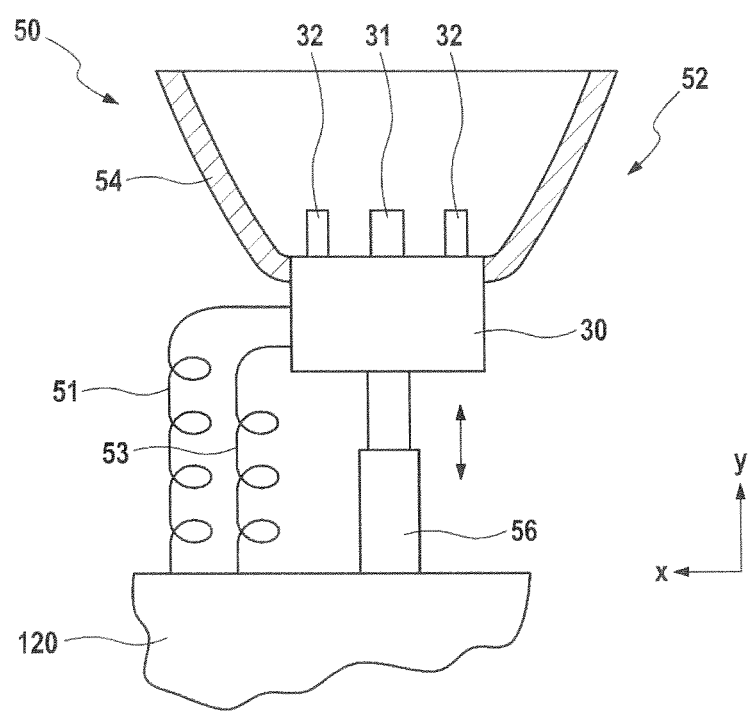

FIG. 8 shows an embodiment of the coupling system 50 which is arranged on a tractor 120. The coupling system 50 comprises a catching device 52 with a catching funnel 54, a second plug-in unit 30, and a first actuator 56. The second plug-in unit 30 is arranged at the lower end of the catching funnel 54 and comprises a second pneumatic connecting element 31 and two second electrical connecting elements 32. The second plug-in unit 30 is joined by means of a pneumatic line 51 and an electrical line 53 to a control device (not shown) of the tractor 120.

By means of the first actuator 56, the second plug-in unit 30 and the catching funnel 54 can be extended and retracted in the vertical direction. As was described in regard to FIG. 4, the movement of the second plug-in unit 30 makes possible the connection to the first plug-in unit 20 (not shown here). The catching funnel 54 guides the first plug-in unit 20 to the second plug-in unit 30 during the connecting process. In this way, it is ensured that the first plug-in unit 20 and the second plug-in unit 30 are correctly connected.

Figure 9:
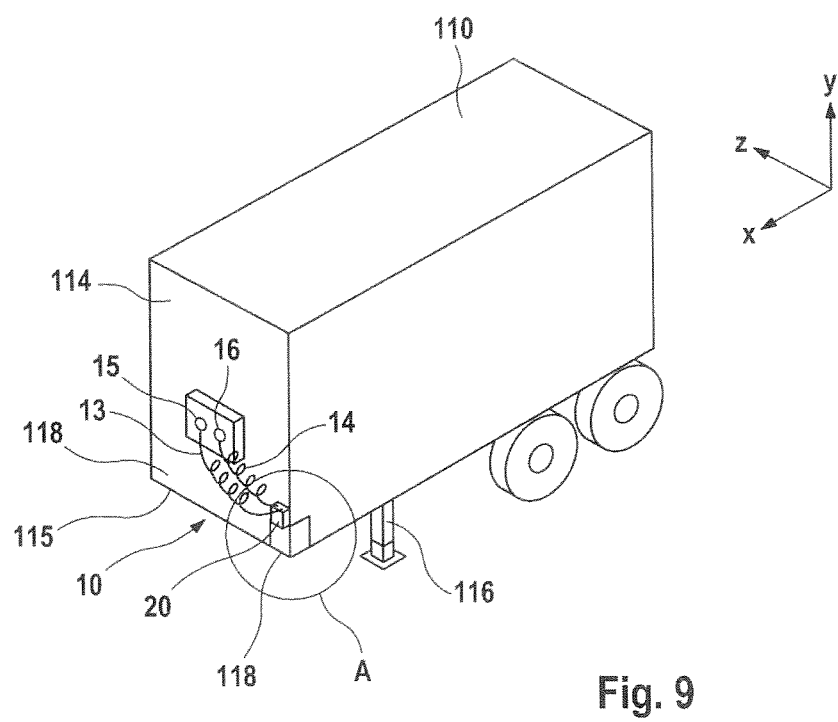
Figure 9A:
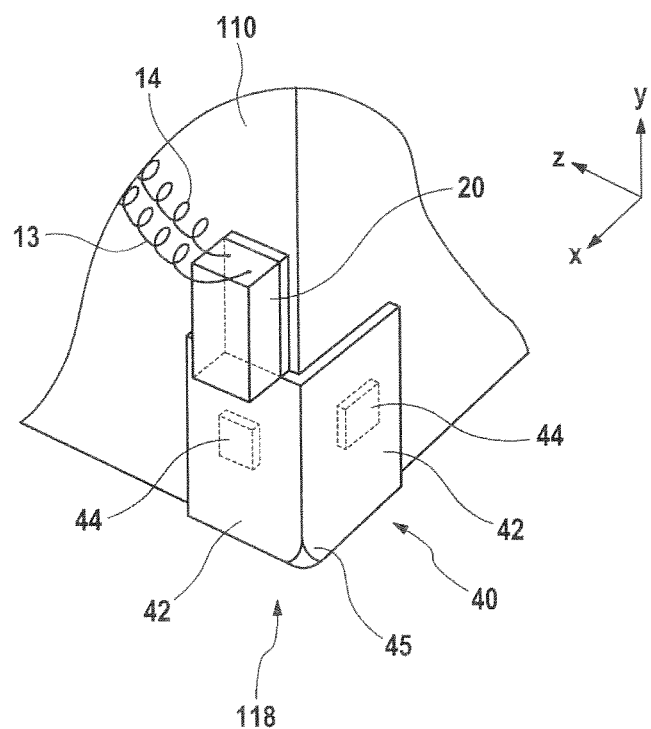

FIGS. 9 and 9A show another embodiment of the connection device 10. The connection device 10 comprises a first plug-in unit 20, which is joined by a pneumatic line 13 to the first pneumatic plug element 15 and by an electrical line 14 to a first electrical plug element 16. Moreover, the connection device 10 comprises a fastening device 40.

The fastening device 40 comprises three flat side pieces 42, arranged respectively at right angles to the other two side pieces 42, so that they form a common corner 45. In FIG. 9A, only two of the three side pieces 42 can be seen.

The fastening device 40 is arranged at a front corner 118 of the front wall 114 of the trailer 110. In the side pieces 42 there is located a respective magnetic element 44, by which the fastening device 40 can be secured to the trailer 110, which is magnetizable in the area of its front corner 118.

The first plug-in unit 20 is connected to the fastening device 40, for example, by a screw or weld connection. After the connecting of the plug elements 15, 16 to the trailer 110, the fastening device 40 joined to the first plug-in unit 20 is mounted on the front corner 118 of the trailer body. In this way, the first plug-in unit is given a defined arrangement on the trailer 110.

Thanks to the defined arrangement of the first plug-in unit 20, the automation of the connection process between the first plug-in unit 20 and second plug-in unit 30 is also simplified by this configuration of the connection device 10, since the position of the first plug-in unit 20 is established at the start of the connection process and does not need to be determined.

Figure 10:
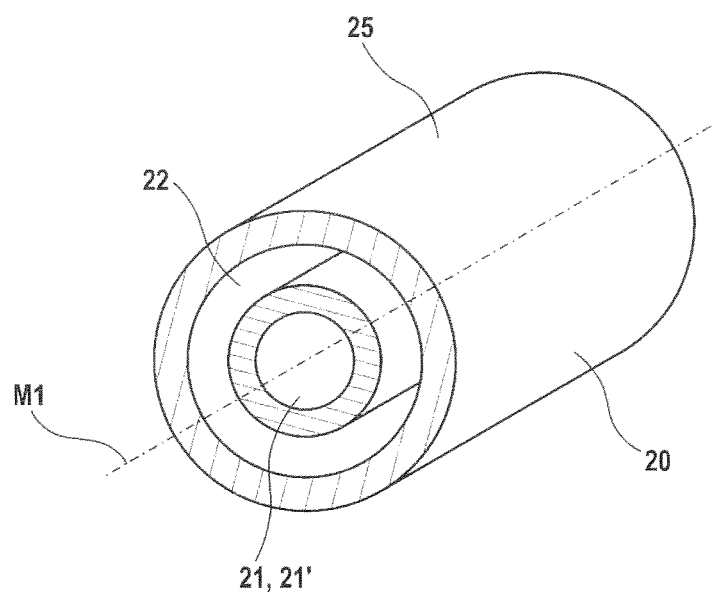

The first plug-in unit 20 represented in FIG. 10 comprises a cylindrical housing 25 having a center axis M1. In the housing 25 there are provided two connecting elements, a first centrally arranged pneumatic connecting element 21' and a first electrical connecting element 22. The first centrally arranged pneumatic connecting element 21' is a cylindrical socket, the first electrical connecting element 22 is an annular slot. The connecting elements 21', 22 are arranged concentrically. A complementary second plug-in unit (not shown here) comprises second connecting elements in the form of protrusions, which extend into the first connecting elements of the first plug-in unit 20 when the plug-in units are joined together. For the connection of the pneumatic connecting elements, at least one of the pneumatic connecting elements can be provided with a sealing element.

Figure 11:
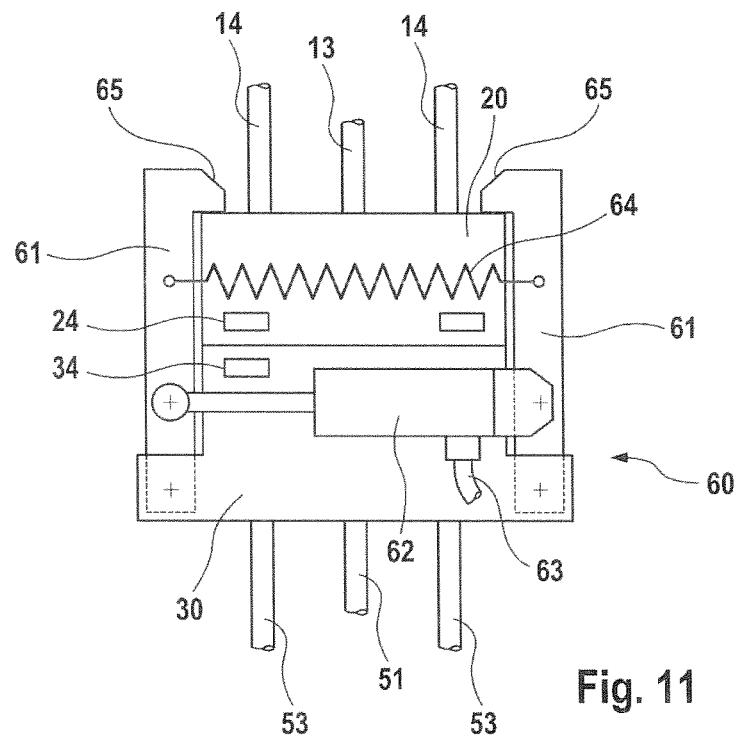

FIG. 11 shows a first plug-in unit 20 with a complementary second plug-in unit 30. The first plug-in unit 20 is attached to a pneumatic line 13 and two electrical lines 14. The second plug-in unit 30 is attached to a pneumatic line 51 and two electrical lines 53.

The second plug-in unit 30 comprises an arresting means 60, which holds together the plug-in units 20, 30 after they have been plugged together and prevents a direct separation of the plug-in units 20, 30. The arresting means 60 in other embodiments may also be arranged on the first plug-in unit 20. Furthermore, it is also possible in other embodiments for individual components of the arresting means 60 to be distributed among the plug-in units 20, 30.

The arresting means 60 comprises two arresting hooks 61, which in the state represented in FIG. 11 reach around the first plug-in unit 20 with form fitting. An arresting spring 64 prevents the two arresting hooks 61 from moving apart and loosening the form fit. Each arresting hook 61 has a bevel 65. The bevels 65 have the effect of moving apart the arresting hooks 61 when the plug-in units 20, 30 are plugged together, so that the first plug-in unit 20 can slip in between the arresting hooks 61. When the end position of the plugging process has been reached as shown in FIG. 11, the form fit is produced by the arresting spring 64.

For the automatic releasing of the arresting, a second actuator 62 is provided, which is connected to the two arresting hooks 61. The second actuator 62 can be operated via a control line 63. When the second actuator 62 is operated, the arresting hooks 61 are forced apart against the spring force of the arresting spring 64 and the form fit is released. After this, the two plug-in units 20, 30 can be pulled apart, thereby releasing their connection.

The first plug-in unit 20 comprises a first locating device 24 and the second plug-in unit 30 comprises a second locating device 34. Preferably, one of the locating devices 24, 34 is designed as a transmitter and one as a receiver. The locating devices 24, 34 for example may be based on RFID, NFC or Bluetooth Low Energy technology. Thanks to the locating devices 24, 34, it can be ascertained whether the plug-in units 20, 30 have been fastened together in the desired manner.

Figure 12:
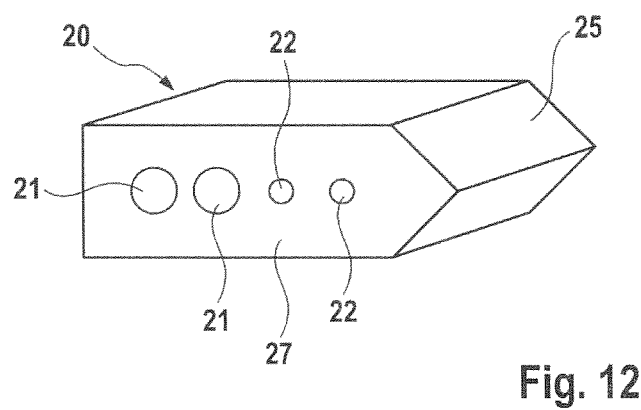

FIG. 12 shows another embodiment of a first plug-in unit 20. The first plug-in unit 20 comprises two first pneumatic connecting elements 21 and two first electrical connecting elements 22 situated alongside each other in a row. The first plug-in unit 20 moreover comprises a housing 25 with a non-rotationally symmetrical outer contour. In the embodiment shown, the housing 25 has a pentagon cross section. In other embodiments, this cross section may be different, but each time it will be noted that the cross section is not rotationally symmetrical. In this way, it is prevented that a complementary second plug-in unit 30 (not shown here) can be connected to the first plug-in unit 20 in two different ways. This prevents a faulty connection of the two plug-in units 20, 30.

LIST OF REFERENCE NUMBERS 10 connection device
11 first end
12 second end
13 pneumatic line
14 electrical line
15 first pneumatic plug element
16 first electrical plug element
20 first plug-in unit
21 first pneumatic connecting element
21' centrally arranged first pneumatic connecting element
22 first electrical connecting element
24 first locating device
25 housing
27 first end face
28 outer side
20 second plug-in unit
31 second pneumatic connecting element
31' centrally arranged second pneumatic connecting element
32 second electrical connecting element 34 second locating device
37 second end face
40 fastening device
42 side piece
44 magnetic element
45 corner
50 coupling system
51 pneumatic line
52 catching device
53 electrical line
54 catching funnel
56 first actuator
60 arresting means
61 arresting hook
62 second actuator
63 control line
64 arresting spring
65 bevel
70 connection system
100 tractor-trailer combination
110 trailer
111 second pneumatic plug element
112 second electrical plug element
114 front wall
115 bottom edge
116 support jack
117 king pin
118 front corner
120 tractor
122 lifting fifth wheel coupling
M1 center axis
M2 center axis

What is claimed is:

1. A connection device for connecting of electrical and pneumatic lines between a tractor and a trailer, comprising:
   a first end, a second end, and at least two lines connecting the two ends,
   wherein at least a first pneumatic plug element and/or at least a first electrical plug element is arranged at the first end,
   wherein a first plug-in unit is arranged at the second end, having at least a first pneumatic connecting element and/or at least a first electrical connecting element, and
   further including at least one fastening device that is permanently joined to the first plug-in unit, whereby the joined at least one fastening device and the first plug-in unit can be releasably fastened to a predetermined location on the trailer in a defined arrangement, the defined arrangement adapted to enable automation of a subsequent connection between the first plug-in unit and a second plug-in unit of the tractor, and
   wherein a holding force of the joined at least one fastening device and the first plug-in unit to the trailer is greater than an inserting force between the first plug-in unit and the second plug-in unit.

2. The connection device according to claim 1, wherein the first plug-in unit comprises a non-rotationally symmetrical housing.

3. The connection device according to claim 1, wherein the first connecting elements are provided at least partly in rotationally symmetrical double occupancy.

4. The connection device according to claim 1, wherein the first pneumatic and the first electrical connecting element are arranged concentrically.

5. The connection device according to claim 1, wherein the first plug-in unit comprises at least one centrally arranged first pneumatic connecting element.

6. The connection device according to claim 1, wherein the fastening device is arranged at least partly on the first plug-in unit.

7. The connection device according to claim 1, wherein the fastening device is at least partly magnetic or comprises at least one magnetic element.

8. The connection device according to claim 1, wherein the fastening device comprises two or three platelike side pieces arranged at right angles to each other.

9. The connection device according to claim 1, wherein the first plug-in unit comprises a first locating device.

10. The connection device according to claim 1, wherein the lines are flexible.

11. The connection device according to claim 1, wherein the first connecting elements of the first plug-in unit are plugs and/or sockets.

12. The connection device according to claim 1, wherein the first plug-in unit has a common housing for the first pneumatic and electrical connecting elements.

13. The connection device according to claim 1, wherein the first plug-in unit comprises a first housing for the first pneumatic connecting elements and a second housing for the first electrical connecting elements, the housings being joined together.

14. A connection system for a tractor-trailer combination having the connection device according to claim 1 and comprising a coupling system which can be arranged on the tractor of the tractor-trailer combination, having a second plug-in unit which is designed to be complementary to the first plug-in unit and having at least one second pneumatic connecting element and at least one second electrical connecting element.

15. The connection system according to claim 14, wherein the second connecting elements are provided at least partly in rotationally symmetrical double occupancy.

16. The connection system according to claim 14, wherein the second pneumatic and the second electrical connecting element are arranged concentrically.

17. The connection system according to claim 14,
   wherein the second plug-in unit comprises at least one centrally arranged second pneumatic connecting element, or
   wherein the coupling system comprises a catching device for catching the first plug-in unit, or
   wherein the catching device can be extended together with the second plug-in unit by a pneumatic and/or hydraulic and/or electrical first actuator, or
   wherein the first plug-in unit and/or the second plug-in unit comprises at least one arresting means for the releasable fastening of the plug-in units to each other, or
   wherein the arresting means is automatically releasable, or
   a combination thereof.

18. A tractor-trailer combination having a tractor, a trailer and a connection device according to claim 1 or a connection system having the connection device and comprising a coupling system which can be arranged on the tractor of the tractor-trailer combination, having a second plug-in unit which is designed to be complementary to the first plug-in unit and having at least one second pneumatic connecting element and at least one second electrical connecting element,
   wherein the trailer comprises second pneumatic and electrical plug elements which are complementary to the first plug elements of the connection device.

19. The tractor-trailer combination according to claim 18,
wherein the tractor is autonomous and comprises a drive, a control unit for control of the drive, a communication unit for exchanging information with a traffic management system and a locating unit for locating the tractor, or
wherein the first plug-in unit is fastened to a front wall of the trailer, or
wherein the first plug-in unit is fastened to the front wall above a bottom edge of the front wall of the trailer, or
wherein the first plug-in unit is fastened to an edge or one of the front corners of the trailer, or
wherein the force of adhesion of the fastening device of the first plug-in unit to the trailer is greater than the inserting and releasing forces of the first and second plug-in unit, or
wherein the second plug-in unit comprises a second locating device, which interacts with the first locating device of the first plug-in unit, or
a combination thereof.

* * * * *